G. S. KING.
FRONT AXLE RADIUS ROD.
APPLICATION FILED DEC. 29, 1919.
1,383,817.
Patented July 5, 1921.
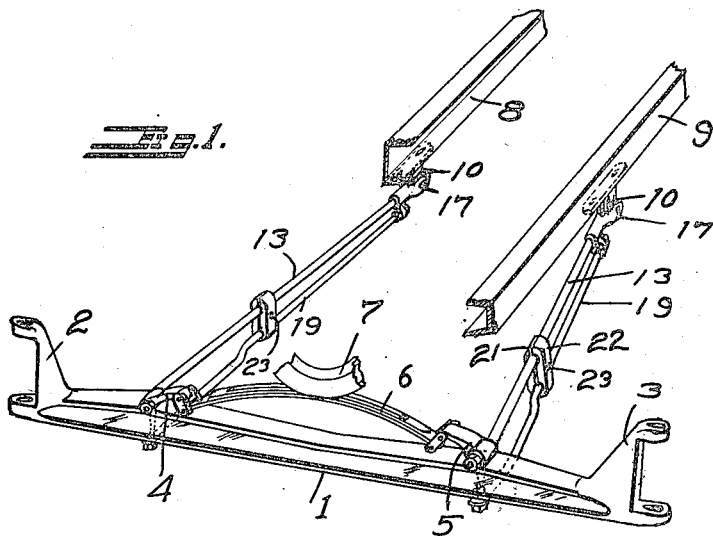
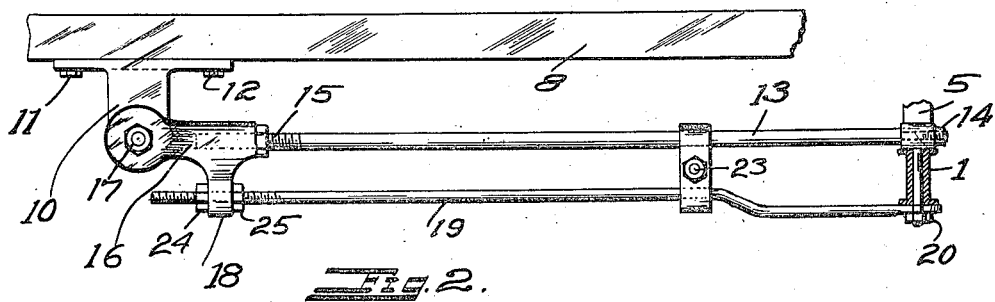
INVENTOR.
George S. King
BY
Carlos P. Griffin
ATTORNEY.

UNITED STATES PATENT OFFICE.

GEORGE S. KING, OF SOUTH BERKELEY, CALIFORNIA.

FRONT-AXLE RADIUS-ROD.

1,383,817.     Specification of Letters Patent.     Patented July 5, 1921.

Application filed December 29, 1919. Serial No. 347,967.

*To all whom it may concern:*

Be it known that I, GEORGE S. KING, citizen of the United States, residing at South Berkeley, in the county of Alameda, State of California, have invented a new and useful Front-Axle Radius-Rod, of which the following is a specification in such full and clear terms as will enable those skilled in the art to construct and use the same.

This invention relates to a front axle radius rod, and its object is to provide means whereby the proper position of the axle may be insured in that type of cars in which the axle is not held in a fixed position by the springs.

This particular radius rod is intended to take the place on a popular machine now in use, of the radius rod used on that machine which consists of two rods connected together in a V shaped form; and it is intended to make the machine more stable and to give greater strength and stiffness to the front axle assembly and to improve the driving qualities of the car.

Other objects of the invention will appear as the description proceeds.

An embodiment of the invention is shown in the accompanying drawings in which the same reference numeral is applied to the same portion throughout, but I am aware that there may be modifications thereof.

Figure 1 is a perspective view showing the front axle of an automobile and showing portions of the side rails of the frame.

Fig. 2 is a side elevation of the radius rod showing it attached to the axle and motor car frame.

The numeral 1 indicates the axle which has the usual steering knuckles 2 and 3, and which also carries knuckles to the fixtures 4 and 5, known as perches, for the support of the spring 6.

The spring supports a cross member 7 which is connected to the front end of the frame members 8 and 9, but which connection is not shown in the present instance because it forms no part of the present invention.

The radius rod supplied with the member of machine motion is removed, and a depending bracket 10 is secured to the under side of each frame member by means of bolts 11 and 12.

The radius rod consists of a round bar 13 having one end extended through the hole in the perch 5 and secured there by means of a nut 14.

The opposite end of the rod 13 is threaded at 15, and it extends into a yoke 16 which is pivotally secured to the depending bracket 10 by means of the pin 17.

The member 16 has a depending lug 18, which lug has a hole to receive a rod 19, which rod extends to the axle and is secured thereto by means of the nut 20 on the lower end of the bolt which holds the perch in place.

In order to stiffen the construction, two plates 21, 22 are fitted against the other rods and secured thereto by means of the bolt 23.

The end of the rod 19 which passes through the lug 18 is threaded to receive the nuts 24, 25, the object of which is to adjust the angle of the front axle with respect to the frame of the vehicle in order to insure proper steering of the car.

What I claim is as follows, but various modifications may be made in the construction shown in the drawings and above particularly described form, within the purview of my invention:

A radius rod for motor car axles comprising a bracket adapted to be secured to the under side of a motor car frame, a yoke pivotally connected to the bracket, a rod threaded into said yoke and connected at its opposite end to the axle, a second rod connected to the under side of the axle and secured to a depending lug on the yoke, lock nuts for adjusting the position of the lower rod and means to connect the two rods to prevent them from vibrating unduly.

In testimony whereof I have hereunto set my hand this 13th day of December A. D. 1919.

GEORGE S. KING.